United States Patent [19]
Uchikawa

[11] Patent Number: 5,970,967
[45] Date of Patent: Oct. 26, 1999

[54] METHOD AND APPARATUS FOR DIAGNOSING AN ABNORMALITY IN A WIDE RANGE AIR-FUEL RATIO SENSOR

[75] Inventor: Akira Uchikawa, Atsugi, Japan

[73] Assignee: Unisia Jecs Corporation, Kanagawa-ken, Japan

[21] Appl. No.: 08/987,098

[22] Filed: Dec. 8, 1997

[30] Foreign Application Priority Data

Dec. 11, 1996 [JP] Japan .................................. 8-331015

[51] Int. Cl.⁶ .................................................. F02D 41/14
[52] U.S. Cl. ...................................... 123/688; 73/23.32
[58] Field of Search ........................... 123/688; 73/118.1, 73/23.32; 701/109; 204/401

[56] References Cited

U.S. PATENT DOCUMENTS

| | | | |
|---|---|---|---|
| 5,212,947 | 5/1993 | Fujimoto et al. | 123/688 |
| 5,235,957 | 8/1993 | Furuya | 123/688 |
| 5,485,382 | 1/1996 | Seki et al. | 123/688 |
| 5,610,321 | 3/1997 | Shinmoto | 73/23.32 |

FOREIGN PATENT DOCUMENTS

1-123141  5/1989  Japan .
1-124758  5/1989  Japan .

*Primary Examiner*—Willis R. Wolfe
*Assistant Examiner*—Mahmoud M. Gimie
*Attorney, Agent, or Firm*—McDermott, Will & Emery

[57] ABSTRACT

An object is to carry out abnormality diagnosis of a wide range air-fuel ratio sensor to a high accuracy, with a relatively simple construction. Judgment is made as to whether abnormality diagnosis permit conditions have materialized, and if materialized, a detection value of an air-fuel ratio sensor is monitored. It is then judged if the responsiveness of a change in the detection value of the air-fuel ratio sensor subsequent to changing a target air-fuel ratio is within a predetermined range. If so, an OK judgment is given. If not, an NG judgment is given and a warning lamp is illuminated to advise the driver of the abnormality in the air-fuel ratio sensor so as to take action. With this arrangement, abnormality diagnosis of a wide range air-fuel ratio sensor can be carried out to a high accuracy with a relatively simple construction.

8 Claims, 6 Drawing Sheets

METHOD AND APPARATUS FOR DIAGNOSING AN ABNORMALITY IN A WIDE RANGE AIR-FUEL RATIO SENSOR

BACKGROUND OF THE INVENTION

1. Field of the Invention

The present invention relates to a method and apparatus for carrying out abnormality diagnosis of a so-called wide range air-fuel ratio sensor.

2. Description of the Related Art

As a conventional so-called wide range air-fuel ratio sensor, there is for example the devices disclosed in Japanese Unexamined Patent Publication Nos. 1-123141, and 1-124758.

With these devices, a specific constituent concentration (for example oxygen concentration) in the engine exhaust is detected, and based on this, the air-fuel ratio can be detected over a wide range (in both the lean and rich air-fuel ratio regions).

However, technology for diagnosing for example that such a so-called wide range air-fuel ratio sensor is able to operate normally, or that the performance has not deteriorated, has not yet been established. Hence it cannot be known if a wide range air-fuel ratio sensor can correctly detect the air-fuel ratio. There is thus the possibility of a fault for example in the air-fuel ratio control of an internal combustion engine, and hence the possibility that operating performance, exhaust performance, fuel consumption performance and the like cannot be suitably maintained.

SUMMARY OF THE INVENTION

The present invention takes into consideration the current situation, with the object of providing, with a relatively simple construction, a method and apparatus for diagnosing an abnormality in a wide range air-fuel ratio sensor which can diagnose to a high accuracy if the wide range air-fuel ratio sensor is able to operate normally.

Accordingly, the method and apparatus for diagnosing an abnormality in a wide range air-fuel ratio sensor according to the present invention comprises:

an air-fuel ratio control step or device for controlling air-fuel ratio to a target air-fuel ratio;

a target air-fuel ratio changing step or device for changing the target air-fuel ratio;

a detection value change detection step or device for detecting the behaviour of a change in a detection value of the wide range air-fuel ratio sensor; and an abnormality diagnosis step or device for diagnosing an abnormality in the wide range air-fuel ratio sensor based on the detection results of the detection value change detection step or device from after the target air-fuel ratio has been changed by the target air-fuel ratio changing step or device.

More specifically, since when the target air-fuel ratio is changed, the air-fuel ratio control object (the fuel injection quantity or intake air quantity) is changed so as to obtain the target air-fuel ratio after the change, then if there is no abnormality in the air-fuel ratio sensor, it can be expected that the detection value of the wide range air-fuel ratio sensor will also change following the change in the target air-fuel ratio. Consequently if the behaviour of a change in the detection value of the air-fuel ratio sensor which changes following the change in the target air-fuel ratio is observed, then it is possible to diagnose the presence of an abnormality in the air-fuel ratio sensor.

Therefore, with the present invention, the target air-fuel ratio is changed, and abnormality diagnosis of the wide range air-fuel ratio sensor is carried out based on the behaviour of the subsequent change in the detection value of the air-fuel sensor. Consequently, with a simple construction, it is possible to diagnose quickly and to a high accuracy the presence of an abnormality in a wide range air-fuel ratio sensor.

The construction may be such that the target air-fuel ratio changing step or device is a step or device which forcibly oscillates the target air-fuel ratio.

If this is done, then for example while increasing the purification performance of an exhaust purification catalytic converter by oscillating the target air-fuel ratio of a catalytic converter perturbation control, then at the same time, the abnormality diagnosis of the wide range air-fuel ratio sensor can be carried out using the target air-fuel ratio oscillation. Consequently, with a simple construction and while maintaining a high exhaust performance, it is possible to diagnose quickly and to a high accuracy the presence of an abnormality in a wide range air-fuel ratio sensor.

Moreover, the construction may be such that the abnormality diagnosis step or device diagnoses an abnormality in the wide range air-fuel ratio sensor based on a required time from after the target air-fuel ratio is changed by the target air-fuel ratio changing step or device until the detection value of the wide range air-fuel ratio sensor intersects a predetermined value or a value corresponding to the target air-fuel ratio subsequent to changing by the target air-fuel ratio changing step or device.

In this way, with a simple construction, it is possible to diagnose to a high accuracy an abnormality in the wide range air-fuel ratio sensor.

Furthermore, the construction may be such that the abnormality diagnosis step or device diagnoses an abnormality in the wide range air-fuel ratio sensor based on a required time from after the target air-fuel ratio is changed by the target air-fuel ratio changing step or device until the detection value of the wide range air-fuel ratio sensor converges on a value corresponding to the target air-fuel ratio subsequent to changing by the target air-fuel ratio changing step or device.

In this way, with a simple construction, it is possible to diagnose to a high accuracy an abnormality in the wide range air-fuel ratio sensor.

Now, there may be provided a steady-state detection step or device for detecting that engine operation is steady-state, and the abnormality diagnosis step or device may include an abnormality diagnosis permit step or device for permitting abnormality diagnosis of the wide range air-fuel ratio sensor when detected by the steady-state detection step or device that engine operation is steady-state.

In this way, it is possible to detect to a high accuracy a change in the detection value of the wide range air-fuel ratio sensor attributable to changing of the target air-fuel ratio, without being influenced by the air-fuel ratio change attributable to a change in operating conditions. Therefore it is possible to diagnose an abnormality in the wide range air-fuel ratio sensor to an even greater accuracy.

Other objects and aspects of the present invention will become apparent from the following description of embodiments, given in conjunction with the appended drawings.

DETAILED DESCRIPTION OF THE PREFERRED EMBODIMENT

As follows is a description of an embodiment of the present invention, with reference to the appended drawings.

For the embodiment, a method of diagnosing an abnormality in a wide range air-fuel ratio sensor in the case where the wide range air-fuel ratio sensor is applied to detection of the exhaust air-fuel ratio of an internal combustion engine, will be explained as being representative.

Figure 4:
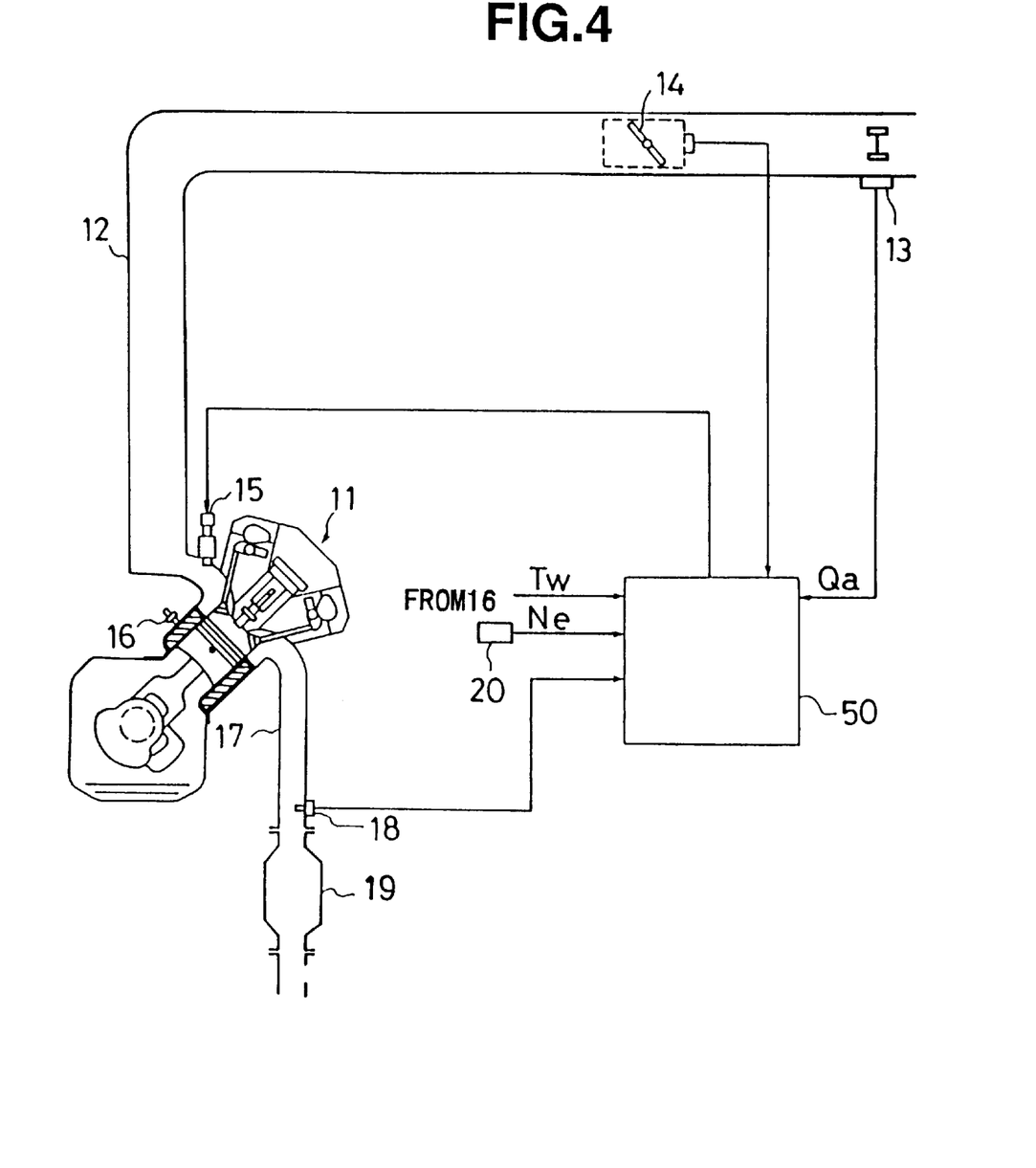
FIG. 4 is a diagram of an overall configuration of an embodiment of the present invention.

In FIG. 4 illustrating the overall configuration of the embodiment of the present invention, an airflow meter 13 for detecting an intake air quantity Qa, and a throttle valve 14 linked to an accelerator pedal, for controlling the intake airflow quantity Qa are provided in an intake passage 12 of an engine 11, with solenoid type fuel injection valves 15 provided for each cylinder in a downstream manifold portion.

The fuel injection valves 15 are driven open by a drive pulse signal which is set as described later in a control unit 50, to thereby inject fuel which is pressure fed from a fuel pump (not shown), and controlled to a predetermined pressure by means of a pressure regulator (not shown). Moreover a water temperature sensor 16 is provided for detecting a cooling water temperature (engine temperature) Tw inside a cooling jacket of the engine 11. A wide range air-fuel ratio sensor 18 (corresponding to the wide range air-fuel ratio sensor of the present invention; also referred to hereunder simply as an air-fuel ratio sensor) is provided in an exhaust passage 17 close to the manifold junction portion, for detecting the air-fuel ratio of the intake air mixture based on the concentration of a specific constituent (for example oxygen) in the exhaust. Downstream of the wide range air-fuel ratio sensor 18 is disposed a three-way catalytic converter 19 serving as an exhaust purification catalytic converter, for purifying the exhaust by oxidizing the CO and HC and reducing the NOx in the exhaust close to for example the theoretical air-fuel ratio (A/F (air quantity/fuel quantity)≈14.7; excess air ratio λ=1). Now for the exhaust purification catalytic converter, a so-call lean NOx catalytic converter which reduces the NOx in the lean region (lean air-fuel ratio) may be adopted, or a standard oxidation catalytic converter may be adopted.

Figure 1:
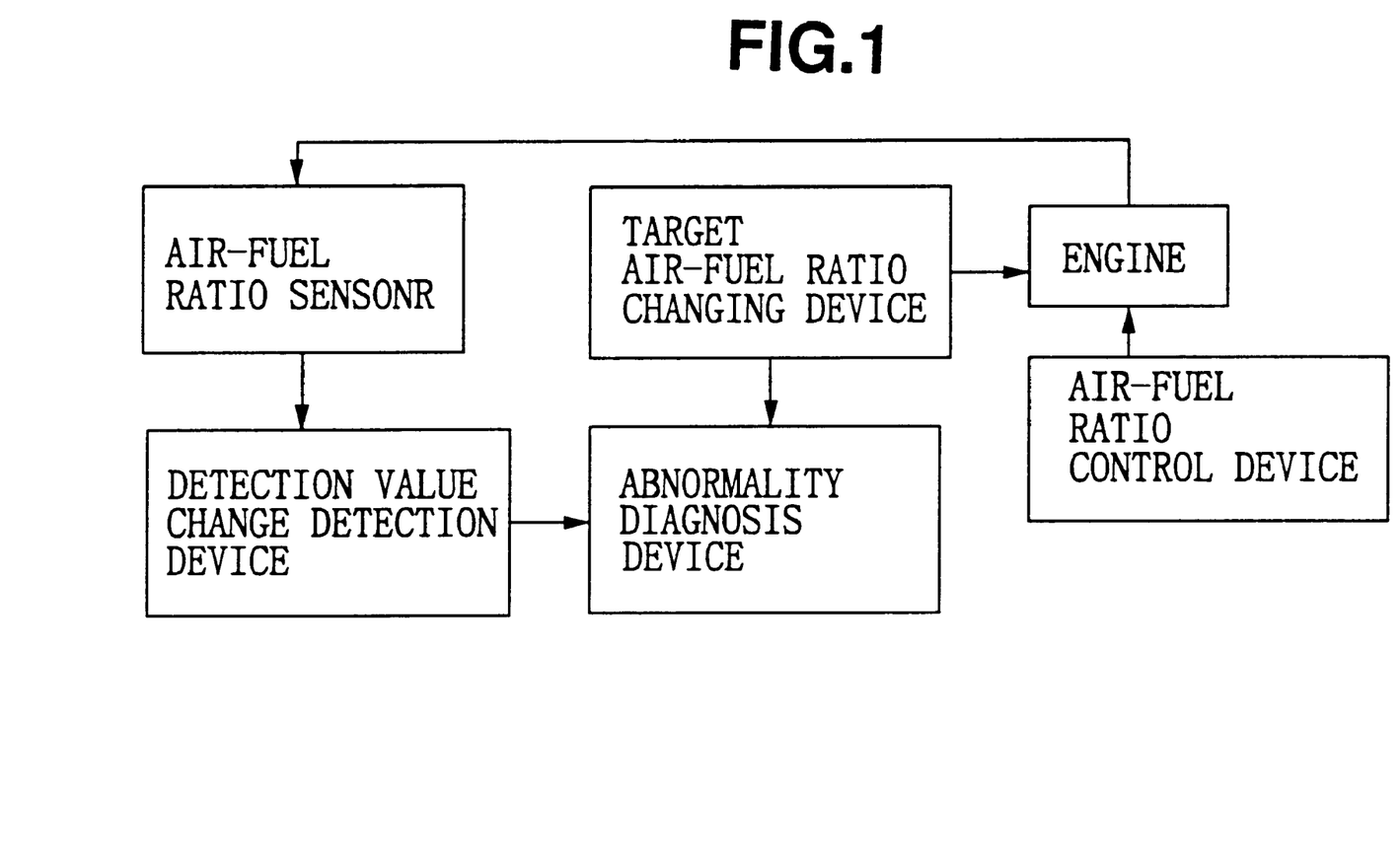
FIG. 1 is a block diagram showing a construction of the present invention.
Figure 2:
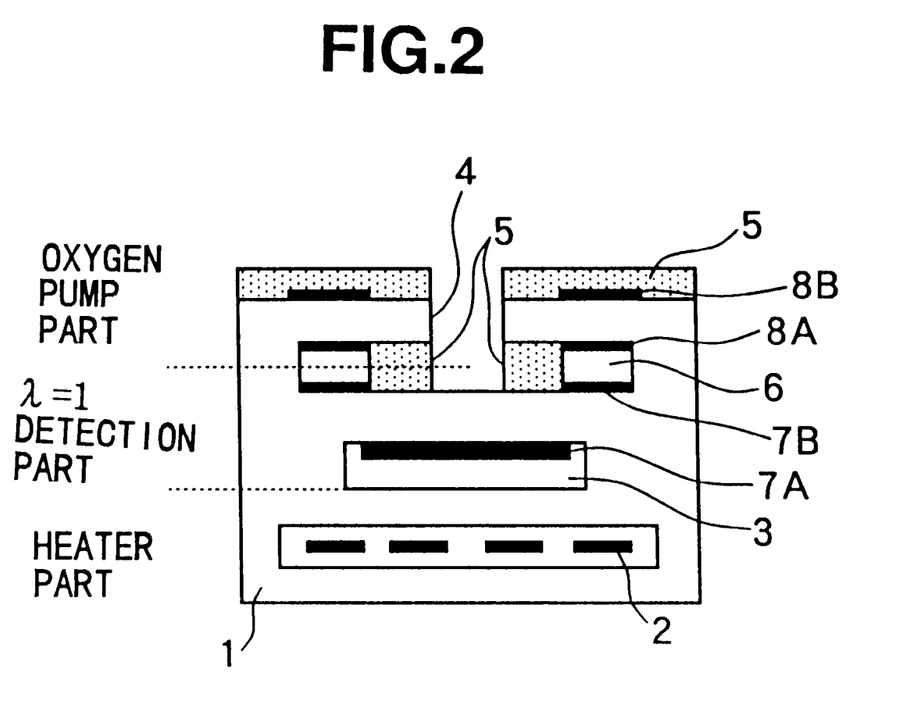
FIG. 2 is a schematic diagram of a wide range air-fuel ratio sensor.

Incidentally, as long as the air-fuel ratio sensor 18 used in the present embodiment is one which utilizes a detection theory similar to the conventional device shown in FIG. 2, then any type of device is satisfactory.

Next is a description of the construction of the air-fuel ratio sensor 18, and air-fuel ratio detection theory.

As shown in FIG. 2, a main body 1 (formed for example from a heat resistant porous insulating material such as zirconia $Zr_2O_3$ having oxygen ion transmission characteristics) incorporating a heater portion 2, is provided thereinside with an atmosphere inlet port 3 for communication with the atmosphere (reference gas), together with a diffusion layer (or a gas diffusion gap) 6 for communication with the gas to be detected (for example the exhaust gas of an internal combustion engine) via a sample gas inlet port 4 and a protective layer 5. Sensing section electrodes 7A, 7B are respectively provided facing the atmosphere inlet port 3 and the gas diffusion layer 6, while oxygen pump electrodes 8A, 8B are respectively provided at the gas diffusion layer 6 and at the periphery of the main body 1 corresponding to the gas diffusion layer 6.

The sensing section electrodes 7A, 7B (sensor section) are for detecting a voltage generated corresponding to an oxygen partial pressure ratio between the sensing section electrodes, which is influenced by the oxygen ion concentration (oxygen partial pressure) inside the gas diffusion layer 6. A predetermined voltage is applied to the oxygen pump electrodes 8A, 8B (specific constituent pump section).

With the sensing section electrodes 7A, 7B, by detecting the voltage generated between the sensing section electrodes due to the oxygen partial pressure ratio, it is possible to detect if the air-fuel ratio is rich or lean relative to the theoretical air-fuel ratio (in other words the excess air ratio λ=1).

Figure 3:
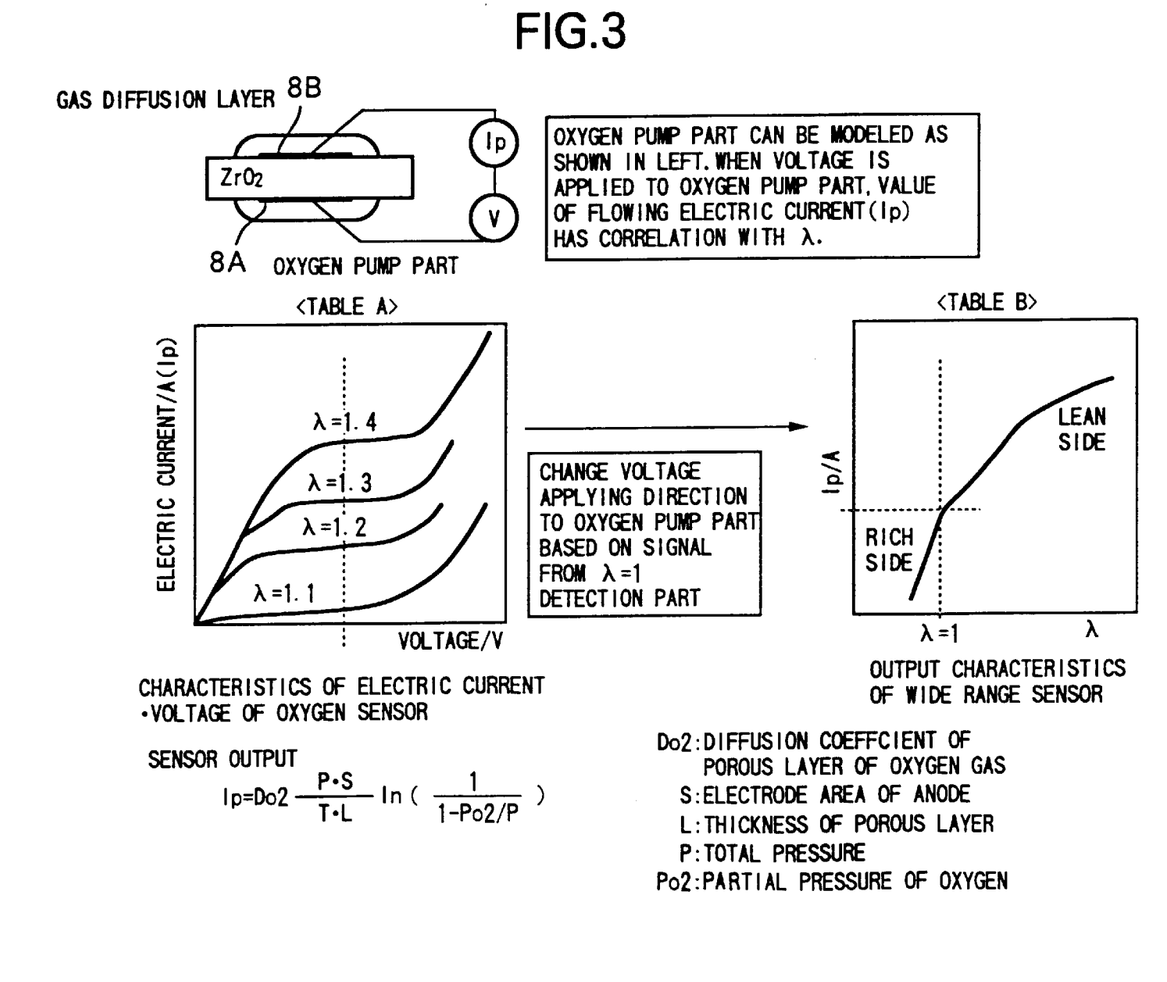
FIG. 3 is a diagram for explaining air-fuel ratio detection theory of a wide range air-fuel ratio sensor.

On the other hand, with the oxygen pump electrodes 8A, 8B which can be illustrated by the model diagram shown in FIG. 3, when a predetermined voltage is applied, the oxygen ions in the gas diffusion layer 6 move corresponding to this, so that a current flows between the oxygen pump electrodes 8A, 8B. A current value Ip (limit current) which flows between the oxygen pump electrodes 8A, 8B when a predetermined voltage is applied, is influenced by the oxygen ion concentration in the gas dispersion layer 6. Hence if the current value Ip (limit current) is detected, then the air-fuel ratio of the gas being detected (in other words the excess air ratio 1) can be detected.

Consequently, a correlation relationship as shown for example in Table A of FIG. 3 between the current and voltage across the oxygen pump electrodes and the air-fuel ratio (in other words the excess air ratio λ) of the gas being detected is obtained.

By inverting the direction of applying the voltage to the oxygen pump electrodes 8A, 8B, based on the rich/lean output from the sensing section electrodes 7A, 7B, then wide range air-fuel ratio detection in the air-fuel ratio regions of both the lean region and the rich region is possible based on the current value Ip (limit current) flowing between the oxygen pump electrodes 8A, 8B.

If the current value Ip between the oxygen pump electrode section is detected by the above air-fuel ratio detection theory, and for example Table B of FIG. 3 is referred to, then the actual air-fuel ratio (excess air ratio 1) of the gas being detected can be detected over a wide range.

The sensor detection value Ip can be obtained for example from the following equation.

$$Ip = Do2 \cdot P \cdot S/(T \cdot L) \cdot ln\{1/(1-Po2/P)\}$$

where:

Do2 is the oxygen gas porous layer diffusion coefficient

S is the electrode surface area of the negative pole

L is the thickness of the porous layer

P is the overall pressure

Po2 is the oxygen partial pressure

T is the temperature

We now return to the overall description referring again to FIG. 4.

A crank angle sensor 20 is housed inside a distributor (not shown in FIG. 4). Engine rotational speed Ne is detected by the control unit 50 by counting at constant intervals crank unit angle signals output from the crank angle sensor 20 in synchronous with the engine rotation, or measuring the period of a crank reference angle signal.

The control unit 50 of the present invention comprises a micro-computer which incorporates a CPU, ROM, RAM, A/D converter, and input/output interface and the like. The control unit 50 receives input signals from the various sensors and controls the injection quantity (that is to say the air-fuel ratio control quantity) of the fuel injection valve 15 as described hereunder. For the various sensors, there is for example the beforementioned air-fuel ratio sensor 18, the airflow meter 13, the water temperature sensor 16, and the crank angle sensor 20.

In controlling the injection quantity, a basic fuel injection pulse width (corresponding to the fuel injection quantity) $Tp=c \times Qa/Ne$ (where c is a constant) is computed from the intake air quantity Qa obtained from the voltage signal from the air flow meter 13, and the engine rotational speed Ne obtained from the signal from the crank angle sensor 20. Then, using a water temperature correction coefficient Kw for forcibly correcting to the rich side at the time of low water temperature, a start up and post start up increase correction coefficient Kas, an air-fuel ratio feedback correction coefficient a and the like, a final effective fuel injection pulse width $Te=Tp \times (1+Kw+Kas+\ldots) \times \alpha \times Z + Ts$ is computed. Here Z is a target air-fuel ratio, while Ts is a voltage correction amount.

The final effective fuel injection pulse width Te is then sent to the fuel injection valves 15 as a drive pulse signal, to thereby inject fuel adjusted to a predetermined amount.

The air-fuel ratio feedback correction coefficient α is a coefficient for correcting deviation from the target air-fuel ratio of the actual air-fuel ratio (detection value) detected by the air-fuel ratio sensor 18. The basic fuel injection pulse width Tp is corrected in the control unit 50 based on this, so that the air-fuel ratio of the combustion mixture gases is feedback controlled to the target air-fuel ratio (for example the theoretical air-fuel ratio).

The basic way of thinking with the present embodiment regarding the control for diagnosing an abnormality in the air-fuel ratio sensor which is carried out by the control unit 50, will now be described.

With the air-fuel ratio sensor abnormality diagnosis of the present embodiment, when an air-fuel ratio control object (fuel injection quantity or intake air quantity) is feedback controlled so that the actual air-fuel ratio (detection value) detected by the air-fuel ratio sensor 18 under steady operating conditions (steady-state of the engine 11) becomes the target air-fuel ratio, the target air-fuel ratio is changed. The feedback control corresponds to the air-fuel ratio control step or device of the present invention, however as mentioned later, the air-fuel ratio control step or device of the present invention may also be a step or device which controls the air-fuel ratio by feedforward control.

At this time, since the air-fuel ratio control object (the fuel injection quantity or intake air quantity) changes in accordance with the change in the target air-fuel ratio, then if there is no abnormality in the air-fuel ratio sensor 18, it can be expected that the detection value of the air-fuel ratio sensor 18 will also change following the change in the target air-fuel ratio. Consequently, if the behaviour of the detection value of the air-fuel ratio sensor 18 which changes following the change in the target air-fuel ratio is observed, then it is possible to diagnose the presence of an abnormality in the air-fuel ratio sensor 18. Now even if the target air-fuel ratio is changed by air-fuel ratio feedforward control, not air-fuel ratio feedback control, since the air-fuel ratio control object (the fuel injection quantity or intake air quantity) is changed, then if there is not an abnormality in the air-fuel ratio sensor 18, the actual air-fuel ratio detected by the air-fuel ratio sensor 18 can also be expected to change following the change in the target air-fuel ratio. Consequently irrespective of whether there is air-fuel ratio feedback control or air-fuel ratio feedforward control, if the behaviour of the detection value of the air-fuel ratio sensor 18 which changes following the change in the target air-fuel ratio is observed, then it is possible to diagnose the presence of an abnormality in the air-fuel ratio sensor 18.

Figure 6:
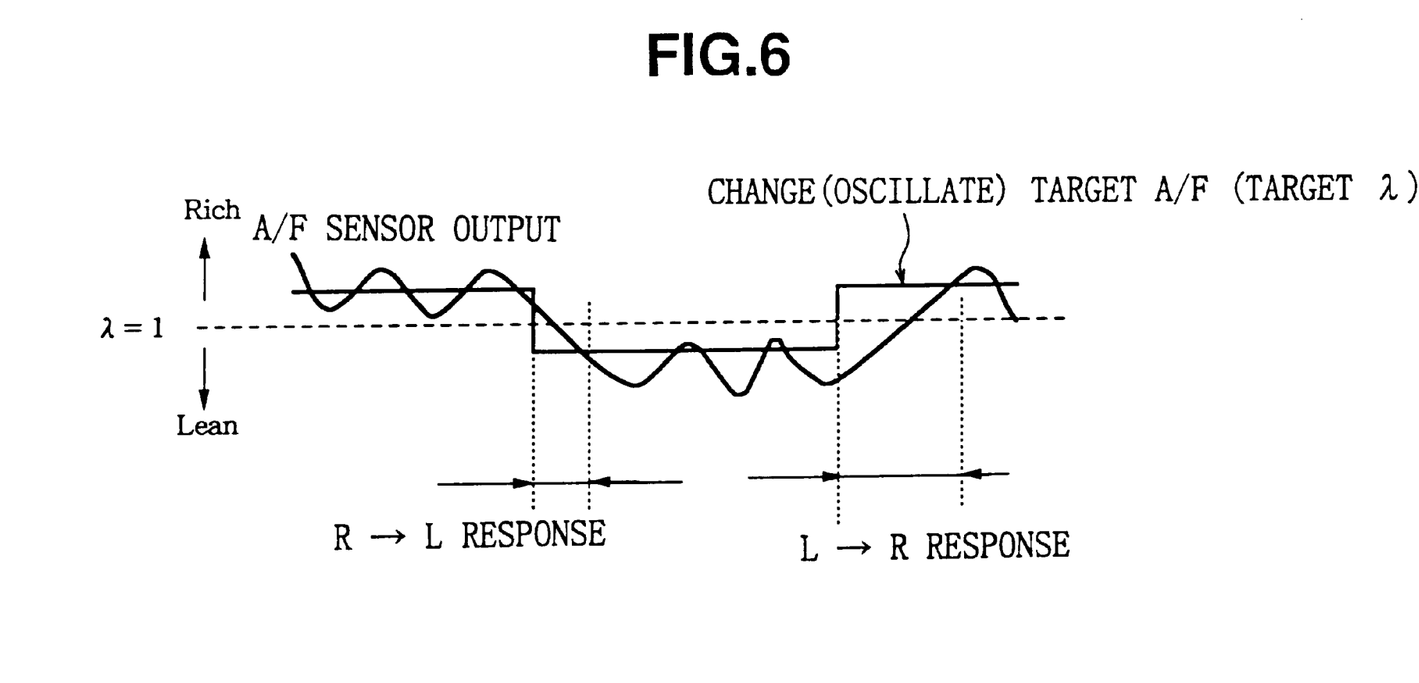
FIG. 6 is a time chart for when a target air-fuel ratio is changed (oscillated), illustrating the behaviour of a change in a detection value of an air-fuel ratio sensor accompanying the change.

More specifically, it is possible to diagnose with high accuracy an abnormality in the air-fuel ratio sensor 18, and in particular the presence of a drop in the response (due for example to blockage of the pores of the gas diffusion layer 6, a deterioration in the respective electrode portions, a fault in the control circuit of the heater section 2, etc.) by for example a required time from when the target air-fuel ratio is changed until the detection value of the air-fuel ratio sensor 18 converges on the target air-fuel ratio, or as shown in FIG. 6, a required time from when the target air-fuel ratio is changed until the detection value of the air-fuel ratio sensor 18 intersects the target air-fuel ratio (alternatively a previously determined set value is suitable). Moreover, it is also possible to diagnose an abnormality in the air-fuel ratio sensor 18 by observing the slope of the change in the detection value of the air-fuel ratio sensor 18 subsequent to changing the target air-fuel ratio.

Now, if the target air-fuel ratio is changed freely in order to diagnose an abnormality in the air-fuel ratio sensor 18, there is the possibility of a deterioration in the exhaust purifying performance of the three-way catalytic converter 19 (or lean NOx catalytic converter, or oxidising catalytic converter). Therefore the range over which the target air-fuel ratio is changed is preferably limited to a range within which a change in the exhaust purification performance of the three-way catalytic converter 19 (or lean NOx catalytic converter, or oxidising catalytic converter) can be permitted.

Moreover, it is effective if the presence of an abnormality in the air-fuel ratio sensor 18 is diagnosed by observing the behaviour of the change in the detection value of the air-fuel ratio sensor 18 corresponding to a forcible change in the target air-fuel ratio in order to increase the exhaust purification efficiency during execution of the catalytic converter perturbation control {regarding this control, with an air-fuel ratio feedback control which uses a wide range air-fuel ratio sensor which can detect the air-fuel ratio over a wide range, the chance of a rich—lean inversion of the exhaust air-fuel ratio is minimal compared to an air-fuel ratio feedback control which uses an oxygen sensor which can only detect rich or lean relative to the theoretical air-fuel ratio. Hence there is the likelihood that adsorption-desorption of the oxygen molecules on the catalyst surface is not carried out effectively so that there is a drop in the efficiency of simultaneously purifying the three constituents (NOx, CO, HC). In order to control this, with an air-fuel ratio feedback control with uses a wide range air-fuel ratio sensor, as shown in FIG. 6, the air-fuel ratio (in other words the target air-fuel ratio) at the inlet to the catalytic converter is forcibly oscillated, thereby increasing the purification efficiency of the three constituents to the maximum limit} as proposed by the present inventors and others, since in this case abnormality diagnosis of the air-fuel ratio sensor 18 can also be carried out to a high accuracy simultaneously with increasing the exhaust purification performance of the catalytic converter to a maximum using the catalytic converter perturbation control.

Figure 5:
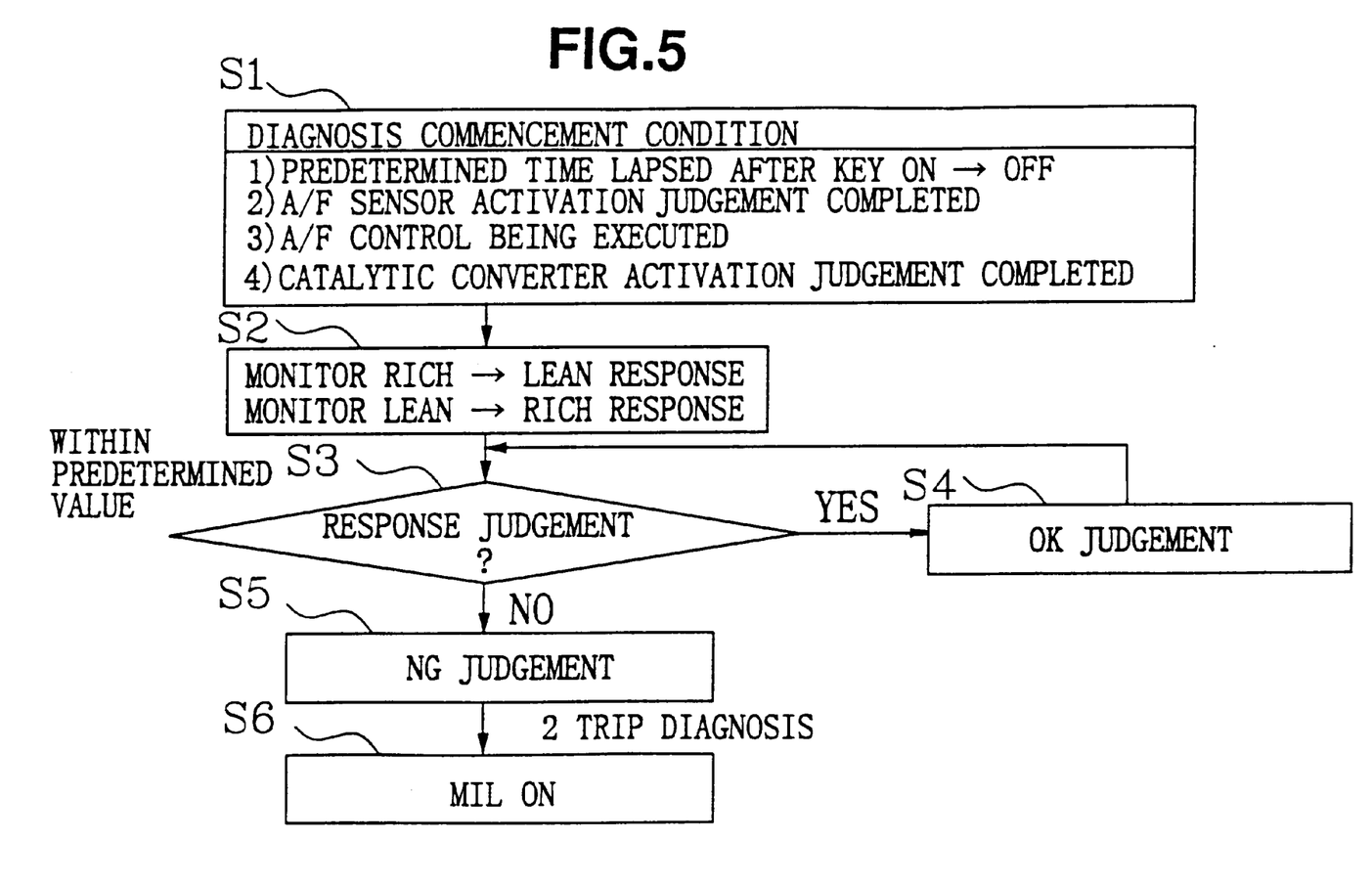
FIG. 5 is a flow chart for explaining a control for diagnosing an abnormality in an air-fuel ratio sensor according to the embodiment.

Air-fuel ratio sensor abnormality diagnosis control of the present embodiment carried out by the control unit 50 based on the above way of thinking will now be described according to the flow chart of FIG. 5. The functions of the target air-fuel ratio changing step or device, the detection value change detection step or device, the abnormality diagnosis step or device, the steady-state detection step or device, and the abnormality diagnosis permit step or device of the present invention, are incorporated as software in the control unit 50 as illustrated below.

In step 1 (with step indicated by S1 in the figures), it is judged if abnormality diagnosis permit conditions have materialized. That is to say, abnormality diagnosis is not permitted until conditions (1)~(4) discussed below, have materialized.

For example:

(1) It is judged if a set time has elapsed from after switching the key from on to off at engine start up (in other words if a predetermined time has elapsed after start up), and if this time has not elapsed, commencement of diagnosis is not permitted. This is to prevent for example; an erroneous diagnosis due to the influence of an increase in starting time and wall flow formation, or an erroneous diagnosis due to carrying out diagnosis under non-active conditions of the air-fuel ratio sensor 18.

(2) It is judged if judgment of activation of the air-fuel ratio sensor (A/F sensor) has been completed, and if not completed, abnormality diagnosis is not permitted. This is to prevent erroneous diagnosis due to carrying out diagnosis under non-active conditions of the air-fuel ratio sensor 18.

(3) It is judged if air-fuel ratio feedback control (A/F control) conditions have materialized (for example engine operation is steady-state conditions) and the beforementioned catalytic converter perturbation control is being executed, and if not being executed, then abnormality diagnosis is not permitted. This is because during execution of the catalytic converter perturbation control, since the air-fuel ratio at the inlet portion of the catalytic converter 19 is oscillated by a predetermined amount at a predetermined period so that the conversion efficiency (purification efficiency) for the three constituents (NOx, CO, HC) is increased, then with the diagnosis method of the present embodiment for diagnosing the presence of an abnormality by detecting (monitoring etc.) the responsiveness to the change in the detection value of the air-fuel ratio sensor 18, the diagnosis accuracy can be increased. Moreover, abnormality diagnosis can be carried out to a high accuracy while maintaining a good exhaust gas performance.

(4) It is judged if the catalytic converter 19 is activated, and if not activated, commencement of diagnosis is not permitted. This is because in the case where the catalytic converter 19 is not activated (while the catalytic converter 19 is not active, in general the air-fuel ratio is kept on the lean side in order to reduce the discharge amount of HC and promote activation) then with oscillation of the air-fuel ratio, there is more possibility of a deterioration in the exhaust performance.

When the conditions of (1)~(4) have materialized, control proceeds to step 2. In step 2, monitoring of the output value from the air-fuel ratio sensor 18 is commenced. For example the response (rich—lean response) of the output value from the air-fuel ratio sensor 18 at the time of rich to lean inversion of the target air-fuel ratio is monitored, and the response (lean—rich response) of the output value from the air-fuel ratio sensor 18 at the time of lean to rich inversion of the target air-fuel ratio is monitored.

Then in step 3, response judgment is carried out. This can be judged for example, based on whether or not the time as shown in FIG. 6, from the point where the target air-fuel ratio inverts from lean to rich until the detection value (output value) of the air-fuel ratio sensor 18 intersects the target air-fuel ratio (rich side target value), or the time from the point where the target air-fuel ratio inverts from rich to lean until the detection value (output value) of the air-fuel ratio sensor 18 intersects the target air-fuel ratio (lean side target value), is within a predetermined value. If within the predetermined value (YES), control proceeds to step 4, while in the case where the predetermined value is exceeded (NO), control proceeds to step 5.

It is also possible to measure the time required from after changing the air-fuel ratio until the detection value of the air-fuel ratio sensor 18 converges on the target air-fuel ratio after the change, and carry out judgment based on whether or not the measurement result is within a predetermined value.

In step 4, since judged that the detection responsiveness is satisfactory, then the responsiveness of the air-fuel ratio sensor 18 is judged to be normal (OK judgment). Control then returns to step 3 to resume abnormality diagnosis by monitoring the detection value of the air-fuel ratio sensor 18.

On the other hand, in step 5, since judged that the detection responsiveness is poor, then the responsiveness of the air-fuel ratio sensor 18 is judged to be abnormal (NG judgment) (for example there is blockage of the pores of the gas diffusion layer 6, a deterioration in the respective electrode portions, a fault in the control circuit of the heater section 2, etc.). Control then proceeds to step 6.

In the case where such an NG judgment occurs in succession, for example twice (two trips), then control proceeds to step 6 and a warning light (MIL) is illuminated to advise the driver to the effect that there is some abnormality in the air-fuel ratio sensor 18 so as to initiate some form of repair. Moreover, in order to avoid as much as possible any deterioration in operating performance and exhaust performance etc., a prohibition can be placed on the air-fuel ratio feedback control based on the detection results of the air-fuel ratio sensor 18, and in particular lean combustion control may be forcibly prohibited.

When in this way control is made to proceed to step 6 in the case where the NG judgment occurs twice in succession (two trips), then the abnormality diagnosis accuracy for the air-fuel ratio sensor 18 can be further increased, since in the case where NG is judged the first time but OK is judged at the time of the next trip, it is likely that the first time NG judgment is erroneous and such an erroneous judgment need not be considered in the abnormality diagnosis. The warning light (MIL) can also be illuminated to advise the driver to the effect that there is some abnormality in the air-fuel ratio sensor 18, in the case where a predetermined number of response judgments are carried out, and an NG judgment is made for at a predetermined proportion of these. Moreover, the warning light (MIL) can of course be illuminated for each NG judgment.

With the present embodiment as described above, since abnormality diagnosis of the air-fuel ratio sensor is carried out while the engine is running after a predetermined time lapse from engine start-up, and during air-fuel ratio feedback control using the air-fuel ratio sensor 18, and based on whether or not the detection value from the air-fuel ratio sensor 18 is changing with good responsiveness following the oscillation of the target air-fuel ratio accompanying execution of the catalytic converter perturbation control, then with a simple construction, it is possible to diagnose quickly and to a high accuracy the presence of an abnormality in the air-fuel ratio sensor.

Now with the abovementioned embodiment, the description has been for monitoring the change in the detection value of the air-fuel ratio sensor 18 following the oscillations of the target air-fuel ratio during catalytic converter perturbation control. However, the invention is not limited to this. For example it is also possible to diagnose the presence of an abnormality in the air-fuel ratio sensor 18 when there is a change in the target air-fuel ratio, for example at the time of carrying out lean combustion or when the air-fuel ratio is forcibly changed for abnormality diagnosis, based on whether or not the detection value of the air-fuel ratio sensor 18 changes with good responsiveness following the air-fuel ratio change.

Moreover with the present embodiment, the air-fuel ratio control step or device has been described as an air-fuel ratio feedback control, with abnormality diagnosis being carried out during this control. However the invention is not limited to this. For example also in the case where the air-fuel ratio control step or device is made an air-fuel ratio feedforward control and the target air-fuel ratio is changed by this, abnormality diagnosis of the air-fuel ratio sensor can be carried out by observing the behaviour of the change in the detection value of the air-fuel ratio sensor 18 after changing the target air-fuel ratio.

The materialization of all of the abovementioned diagnosis permit conditions (1)–(4) is one example of the materialization of the diagnosis permit conditions. However the case where any of the (1)–(4) or a suitable combination has materialized can be made the materialization of the diagnosis permit conditions. That is to say, even when for example only the engine operating conditions being steady-state conditions is made the diagnosis permit condition, since in this case there is no influence from an air-fuel ratio change attributable to a change in the engine operating conditions, the change in the detection value of the wide range air-fuel ratio sensor attributable to the change in the target air-fuel ratio can be detected to a high accuracy. The effect thus obtained is that an abnormality in the wide range air-fuel ratio sensor can be diagnosed to an higher accuracy.

I claim:

1. A method of diagnosing an abnormality in a wide range air-fuel ratio sensor, comprising the steps of:

controlling air-fuel ratio to a target air-fuel ratio;

changing the target air-fuel ratio;

detecting the behavior of a change in a detection value of the wide range air-fuel ratio sensor;

diagnosing an abnormality in the wide range air-fuel ratio sensor based on the detection results of said step of detecting the behavior of a change from after the target air-fuel ratio has been changed by said step of changing the target air-fuel ratio; and detecting that engine operation is steady-state, wherein the step of diagnosing an abnormality includes a step of permitting abnormality diagnosis of the wide range air-fuel ratio sensor when steady-state engine operation is detected by said step of detecting that the engine operation is steady state.

2. The method of diagnosing an abnormality in a wide range air-fuel ratio sensor according to claim 1, wherein said step of changing said target air-fuel ratio forcibly oscillates the target air-fuel ratio.

3. The method of diagnosing an abnormality in a wide range air-fuel ratio sensor according to claim 1, wherein said step of diagnosing an abnormality diagnoses an abnormality in the wide range air-fuel ratio sensor based on a required time from after the target-air fuel ratio is changed by said step of changing said target air fuel ratio until the detection value of the wide range air-fuel ratio sensor intersects a predetermined value or a value corresponding to the target air-fuel ratio subsequent to changing by said step of changing said target air-fuel ratio.

4. The method of diagnosing an abnormality in a wide range air-fuel ratio sensor according to claim 1, wherein said step of diagnosing an abnormality diagnoses an abnormality in the wide range air-fuel ratio sensor based on a required time from after the target-air fuel ratio is changed by said step of changing said target air fuel ratio until the detection value of the wide range air-fuel ratio sensor converges on a value corresponding to the target air-fuel ratio subsequent to changing by said step of changing said target air-fuel ratio.

5. An apparatus for diagnosing an abnormality in a wide range air-fuel ratio sensor, comprising:

air-fuel ratio sensor control means for controlling air-fuel ratio to a target air-fuel ratio;

target air-fuel ratio changing means for changing the target air-fuel ratio;

detection value change detection means for detecting the behavior of a change in a detection value of the wide range air-fuel ratio sensor;

abnormality diagnosis means for diagnosing an abnormality in the wide range air-fuel ratio sensor based on the detection results of said detection value change detection means from after the target air-fuel ratio has been changed by said target air-fuel ratio changing means; and steady-state detection means for detecting that engine operation is steady-state, wherein said abnormality diagnosis means includes an abnormality diagnosis permit means for permitting abnormality diagnosis of the wide range air-fuel ratio sensor when steady-state engine operation is detected by said steady-state detection means.

6. The apparatus for diagnosing an abnormality in a wide range air-fuel ratio sensor according to claim 5, wherein said target air-fuel ratio changing means is a means which forcibly oscillates the target air-fuel ratio.

7. The apparatus for diagnosing an abnormality in a wide range air-fuel ratio sensor according to claim 5, wherein said abnormality diagnosis means diagnoses an abnormality in the wide range air-fuel ratio sensor based on a required time from after the target air-fuel ratio is changed by said target air-fuel ratio changing means until the detection value of the wide range air-fuel ratio sensor intersects a predetermined value or a value corresponding to the target air-fuel ratio subsequent to changing by said target air-fuel ratio changing means.

8. The apparatus for diagnosing an abnormality in a wide range air-fuel ratio sensor according to claim 5, wherein said abnormality diagnosis means diagnoses an abnormality in the wide range air-fuel ratio sensor based on a required time from after the target air-fuel ratio is changed by said target air-fuel ratio changing means until the detection value of the wide range air-fuel ratio sensor converges on a value corresponding to the target air-fuel ratio subsequent to changing by said target air-fuel ratio changing means.

* * * * *